(12) United States Patent
Hyötyläinen

(10) Patent No.: US 7,106,857 B1
(45) Date of Patent: Sep. 12, 2006

(54) WIRELESS COMMUNICATION DEVICES

(75) Inventor: Janne Hyötyläinen, Kangasala (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/553,663

(22) Filed: Apr. 21, 2000

(30) Foreign Application Priority Data

Apr. 21, 1999 (FI) .................................................. 990890

(51) Int. Cl.
*H04M 1/00* (2006.01)

(52) U.S. Cl. ............................ 379/433.04; 379/433.13; 379/433.07

(58) Field of Classification Search ............ 379/433.12, 379/433.13, 433.04, 433.07; 455/575.4, 575.3, 455/90.3
See application file for complete search history.

(56) References Cited

U.S. PATENT DOCUMENTS

| | | | |
|---|---|---|---|
| 5,868,356 A | | 2/1999 | Giedris |
| 6,073,034 A | * | 6/2000 | Jacobsen et al. ....... 379/433.04 |
| 6,370,362 B1 | * | 4/2002 | Hansen et al. .......... 379/433.12 |

FOREIGN PATENT DOCUMENTS

| | | |
|---|---|---|
| DE | 33 23 858 A1 | 1/1985 |
| EP | 0 414 365 A2 | 2/1991 |
| EP | 0536578 A3 | 4/1993 |
| EP | 0 661 823 A1 | 7/1995 |
| EP | 0 802 659 A1 | 10/1997 |
| WO | WO 98/09414 | 3/1998 |
| WO | WO 98/15094 | 4/1998 |
| WO | WO 98/16047 | 4/1998 |

OTHER PUBLICATIONS

Utility model, application U 950468, registration No. 2229, Jul. 11, 1995.

* cited by examiner

*Primary Examiner*—Jack Chiang
(74) *Attorney, Agent, or Firm*—Perman & Green, LLP

(57) ABSTRACT

The invention relates to a wireless communication device (1) comprising at least a display (2) for presenting information which display comprise at least a first edge (2a) and a second edge (2b), wherein information is arranged to be displayed between the first (2a) and second edges (2b) of the display. The wireless communication device (1) further comprises keys (3) for performing key functions having at least keys (10) for selecting a phone number; a housing (6) comprising at least a first end (6d) a second end (6e), and a front panel (6a) located between the first end (6d) and the second end (6e); and a cover part (7) arranged to be movable between a first limit position and a second limit position, in which first limit position the keys (3) for performing key functions are at least partly covered by the cover part (7), and in which second limit position at least part of the keys (3) for performing key functions are not covered by the cover part (7). The first edge (2a) of the display is nearer the second end (6e) of the housing (6) than said second edge (2b) of the display. The keys (10) for selecting a phone number are placed in the housing of the wireless communication device so that they are nearer the second edge (6e) of the housing than the first end (6d) of the housing.

21 Claims, 5 Drawing Sheets

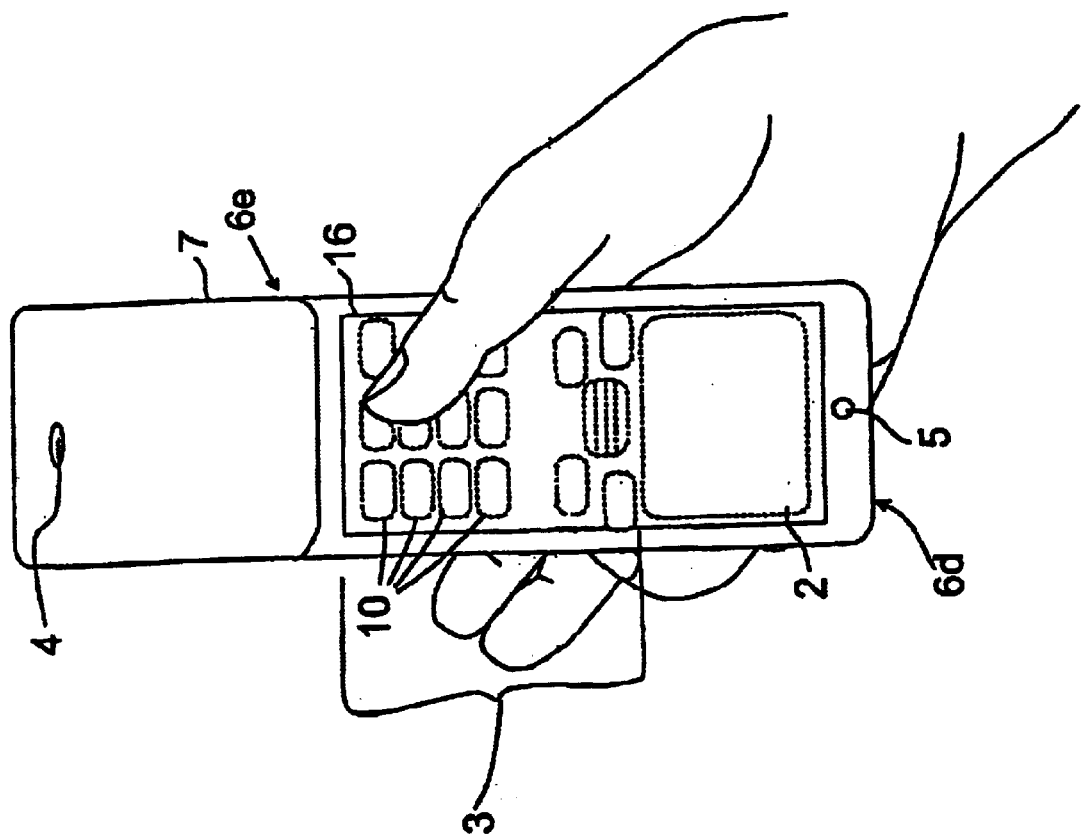

WIRELESS COMMUNICATION DEVICES

BACKGROUND OF THE INVENTION

The present invention relates to a wireless communication device comprising at least a display means for presenting information, said display means having at least a first edge and a second edge, wherein information is arranged to be displayed between said first and second edges of the display means, and said first edge is situated above displayed information and said second edge is situated below displayed information when information is displayed on said display means in a position natural to a user of the wireless communication device, means for performing key functions having at least means for selecting a phone number, a housing comprising at least a first,end, a second end, and a front panel located between the first end and the second end, and a cover part arranged to be movable between a first limit position and a second limit position, in which first limit position said means for performing key functions are at least partly covered by the cover part, and in which second limit position at least part of said first means for performing key functions are not covered by the cover part.

Wireless communication devices, such as GSM mobile phones, have a user interface (UI) for operating the wireless communication device. The user interface comprises typically a keypad, a display means, an electroacoustic transducer such as an earpiece, and an acoustoelectric transducer such as a microphone. By means of the keypad, the user of the wireless communication device can e.g. select a telephone number, answer an incoming call, write text messages, modify the settings of the wireless communication device, etc. On the display means, it is possible to display various information to the user of the wireless communication device, e.g. to inform the telephone number of an incoming call, display a response to key presses made by the user, display information on the settings of the wireless communication device, display text messages, etc. The display means can also be used to display telephone directory information and other user-specific information possibly stored in a memory means, such as the SIM card (Subscriber Identity Module), of the wireless communication device.

Next, the terms to be used in this specification to describe the different parts in the housing of the wireless communication device are defined. The housing of the wireless communication device, or the housing of the handset in such wireless communication devices with a separate handset, is preferably an elongated hexahedron having in the longitudinal direction a cross-sectional form at least partly resembling a rectangle. Thus, according to the use situation, one wall of the housing can be called a front panel and the wall opposite to it a rear panel. Correspondingly, preferably the longitudinal walls can be called the first and second side walls and the ends the first and second end.

In the early stages of development of wireless communication devices, they were intended for use particularly in vehicles. In these so-called car phones, the user interface was either in a separate handset or it was located under the front panel of the housing of the car phone. The vehicles were equipped with a holder for placing the car phone interface in a detachable manner e.g. close to the dash board. Thus, the keypad could be used without removing the interface from the holder. The display means was placed so that it was above the keypad in a situation when the interface was in this holder. Thanks to this arrangement, when the user was for example entering a telephone number the hand did not cover the display means but it was visible to the user.

Also in wireless communication devices that were developed later, the display means and the keypad were placed in the above-described way. Upon using a wireless communication device., it is usually held in either of the hands so that the keypad is closer to the wrist of this hand than the display means. Moreover, the wireless communication device is usually held in a substantially upright position, wherein the display means is slightly higher than the keypad.

In display means used in wireless communication devices, there is preferably a substantially rectangular display field whose edges are called, in a way known as such, by the terms upper, lower, left and right edge. Thus, the display means is imagined in a position in which the characters and possible graphical figures to be displayed to the user are shown in a position and orientation natural to the user enabling them to be read and interpreted in a manner conventional to the user. In spite of this, in practical situations the display means may be in a position in which the upper edge of the display field is lower than the lower edge, but there is still no risk of confusing the terms defining said display field. It is obvious that said characters can vary in different countries and in different language versions of the wireless communication device. For example, Arabic numbers and the Roman character set are generally used in Europe, but the character set used e.g. in China and Japan may also be different. Moreover, the order of presenting information is not the same in all countries than in most of Europe, i.e. from left to right and from the top downwards. In some countries, the order of presenting information is from the right to the left and from the top downwards. Yet another order of presentation used is from the top downwards and from right to left. However, it is common to all these orders of presentation that the display field of the display means can be kept in the same position and that it is possible to use the above-mentioned edge terms defining the display field in an unequivocal way.

Expressed with the above-presented terms of edges of the display field, the user interface of the wireless communication device of prior art is formed in a way that the display means is close to the second end of the housing so that the upper edge of the display field is closer to this second end than the lower edge of the display field. Correspondingly, the keypad is close to the first end of the housing of the wireless communication device when the wireless communication device is in the use position. The appended FIG. 1 shows one such wireless communication device in a perspective view.

The wireless communication device can be used with two hands so that the wireless communication device is held in one hand and the fingers of the other hand can be used to press the keys. The wireless communication device can also be placed e.g. on a table, wherein one hand is used for supporting the wireless communication device in the lateral direction, if necessary, and fingers of the other hand are used to press the keys. However, there is often a need to use the wireless communication device when walking, in a car, or in another situation, in which it is not possible to operate with two hands and there is no table or corresponding support available. Thus, the aim is to operate the wireless communication device with one hand. In wireless communication devices of prior art, this is difficult, because the fingers of the hand holding the wireless communication device should also be used for operating the keypad for performing desired operations, such as selecting a telephone number. When the wireless communication device is held in a hand, the keypad is located at that end of the housing of the wireless communication device which is close to the wrist of the user, that is, expressed with the terms used in this specification, at the first end, and the fingers are closer to the second end of the housing. The fingers should thus be bent to reach the keypad. This is difficult and requires an unnecessary effort and concentration on the operation of pressing the keys. Moreover, for making it possible to press the keys with one hand, the wireless communication device must be supported with the fingers, relatively far from the wrist, wherein the grip by the fingers on the wireless communication device is unstable.

In the development of wireless communication devices, one aim is to reduce the size of the wireless communication device. Upon reduction of the size of the wireless communication device, the size of the keypad may also be reduced, wherein operation with one hand becomes more difficult. This also increases the risk of incorrect pressing of keys, because a finger may, upon pressing a key, hit the adjacent key and cause it to be pressed down. Furthermore, the keypad and the display means are close to each other, wherein when keys are pressed down, part of the display field may be covered by the hand, preventing the user from seeing all the information displayed on the display field. Some wireless communication devices according to prior art are provided with a hinged flap attached to the main body of the wireless communication device that is pivoted in such a way that it overlaps the main body when stowed but extends the overall length of the wireless communication device when in use. This hinged flap is positioned on top of at least part of the keypad when the wireless communication device is not in the normal use position. In a use situation the cover part is pivoted away from the main body of the wireless communication device wherein the keypad becomes available for use. In some wireless communication devices the hinged flap is equipped with a microphone which is thus placed close to the user's mouth in a call situation. However, turning this hinged flap into the open position and back to the closed position is very difficult, if one must use the wireless communication device with one hand.

Wireless communication devices in which the housing is provided with a cover part, which is slidable or turnable in another way are also known. The purpose of this cover part is to protect the keypad and to prevent erroneous key presses when the wireless communication device is not in the use position. In the use position, e.g. during a call or while writing text messages, the cover part is moved away from over the keypad e.g. by sliding, wherein the keypad can be used. In such a wireless communication device, the microphone is placed preferably in the cover part. Also in such a communication device, it may be difficult to slide the cover part when operating the device with one hand.

Finnish utility model FI-U2229 describes a wireless mobile phone, which has keypad and display means reversed, i.e. the display means is below the keypad when the phone is in its normal use position. The figure of the utility model illustrates that the keys which are used for selecting a phone number, e.g. numeric keys, are situated in the middle of the housing of the wireless mobile phone, while other keys, e.g. an answering key, hang up key, menu key and arrow: keys, are situated near the top edge of the housing of the wireless mobile phone. It is still not easy to use a wireless mobile phone implemented according to such a design, e.g. to select a number with one hand, although the keypad is somewhat nearer the top edge of the housing of the wireless mobile phone than in other wireless mobile phones of prior art. Furthermore, this kind of arrangement of the keys- is not optimal for wireless mobile phones having a movable cover part, which allows the user to press at least some of the control keys independent of the position of the cover part.

It is an aim of the present invention to present a wireless communication device, in which the drawbacks presented above are reduced to a significant extent. The wireless communication device according to the present invention is characterized in that said first edge of the display means is nearer the second end of the housing than said second edge of the display means, and that said means for selecting a phone number are placed in the housing of the wireless communication device so that they are nearer the second end of the housing than the first end of the housing.

With the present invention, significant advantages are achieved compared with wireless communication devices of prior art. The wireless communication device according to the invention can be made in a relatively small size, and the usability of the user interface can still be made to correspond to or exceed that of larger wireless communication devices. In the wireless communication device according to the invention, the location of the keypad and the display means is more advantageous in view of operating with one hand than in wireless communication devices of prior art. Thus, it is easier for the user e.g. to select a telephone number than in wireless communication devices of prior art, particularly in situations in which the use of the wireless communication device with two hands is difficult or is not possible. Furthermore, with the better location of the keyboard, the probability of incorrect key pressings is reduced.

BRIEF DESCRIPTION OF THE DRAWINGS

In the following, the present invention will be described in more detail with reference to the appended drawings, in which FIG. 5 shows another wireless communication device according to an advantageous embodiment of the invention comprising a touch screen, seen from the front.

DETAILED DESCRIPTION OF THE INVENTION

Figure 1:
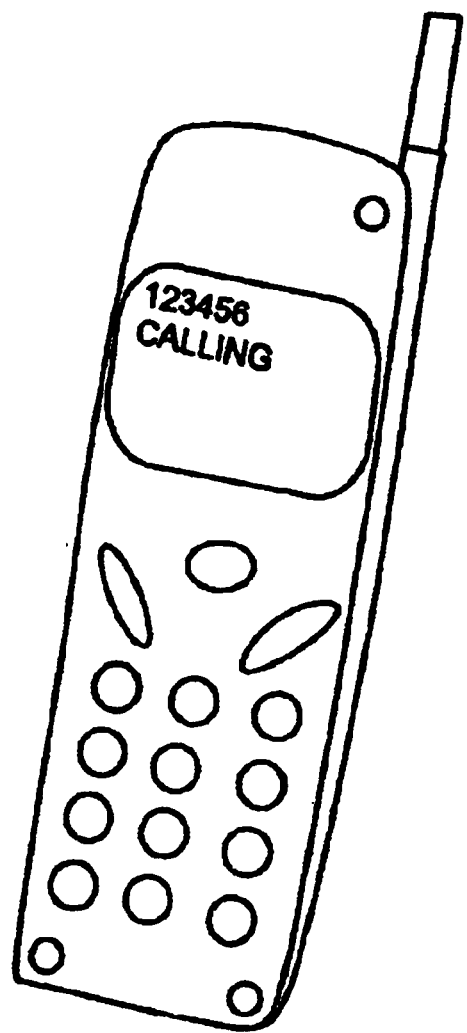
FIG. 1 shows a wireless communication device of prior art in a perspective view.
Figure 2:
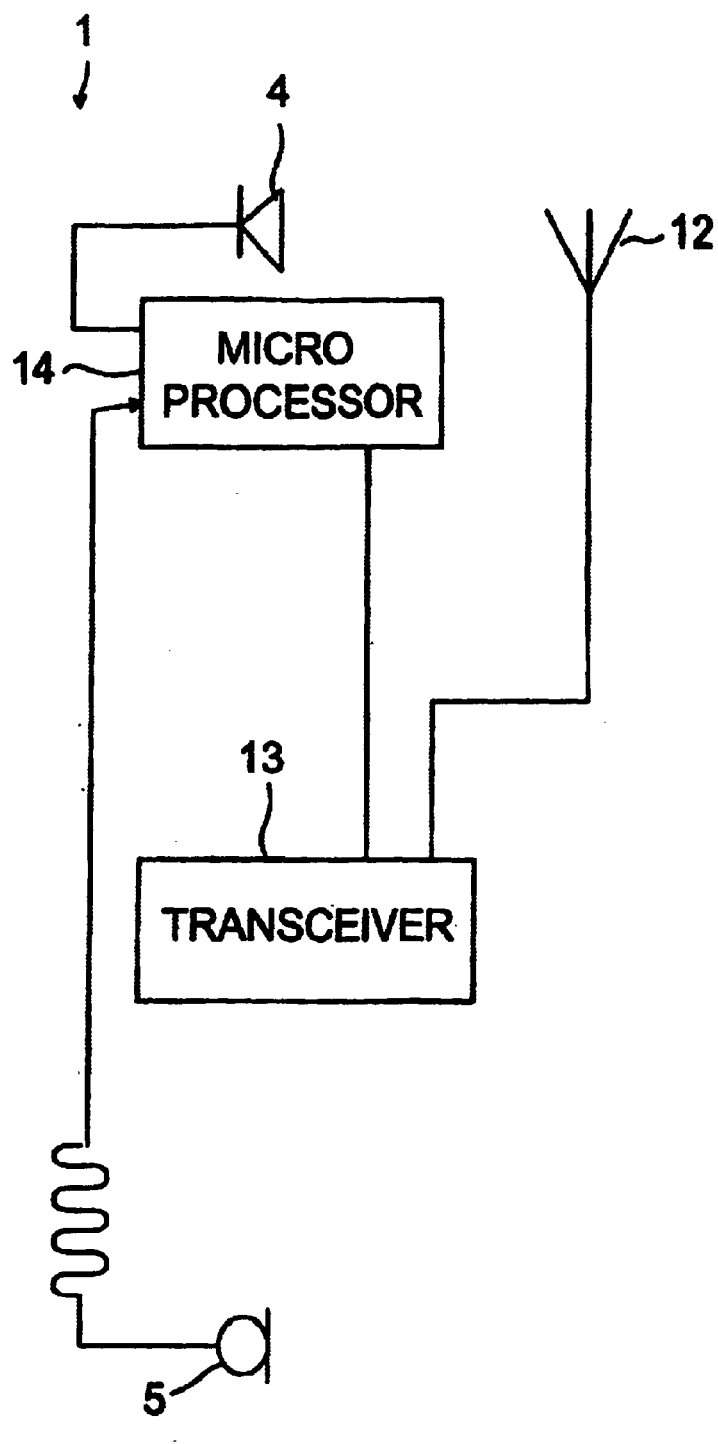
FIG. 2 is a schematic representation of a wireless communication device.

In the following, the invention will be described in more detail with the example of a wireless communication device 1 shown e.g. in FIGS. 2 and 3. The wireless communication device 1 comprises a user interface placed in connection with the front panel 6a in its housing 6, provided with e.g. a display means 2, a keypad 3, an earpiece 4, and a microphone 5. It is obvious that e.g. part of the keypad 3 can be placed also in another location in the housing 6 than in the front panel 6a. In some wireless communication devices, the sound volume of the earpiece 4 is arranged to be controlled e.g. with control buttons 9a, 9b which are placed for example in the side wall 6b, 6c of the housing. Also the operating switch 15 can be placed in the side wall 6b, 6c or the end 6d, 6e instead of the front panel 6a.

The housing 6 of the wireless communication device encloses substantially the whole of the electronic circuitry of the wireless communication device. It has an antenna 12, a transceiver 13 and processing means 14. The antenna 12 can be installed e.g. near the first end, the second end, or it may be completely enclosed within the housing.

The keypad 3 comprises first group 10 of keys or buttons or touch areas labelled 0–9 # and * arranged in an array of four rows and three columns, as is usual, and a second group 11 of control keys or buttons for selecting various actions such as memory storage and recall, last number redial, call start etc., again as usual. The keys could be keys or buttons or any other kind of element for providing input to the processing means 14, preferably input from a user and preferably by means of contact with and/or pressure and/or touching of the key.

The labels of the keypad are oriented such that they are shown in a position and orientation natural to the user enabling them to read and intepreted in a manner conventional to the user, i.e. the labels are presented the right way up when the device is held in a use position.

The first group 10 of keys is used in the normal function mode e.g. in selecting a telephone number. Said first group 10 of keys have, in addition to the normal function mode, preferably a text mode, wherein the first group 10 of keys can be used for writing text, e.g. short messages, in a way known as such.

Furthermore, the second group 11 of control keys comprises advantageously a key for answering a call and a key for terminating a call. On the other hand, these so-called answer key and hang up key can be combined in one key which is used according to the functional mode in question either for answering a call, initiating a call in connection with selecting a telephone number, or terminating a call in a way known as such.

Figure 3:
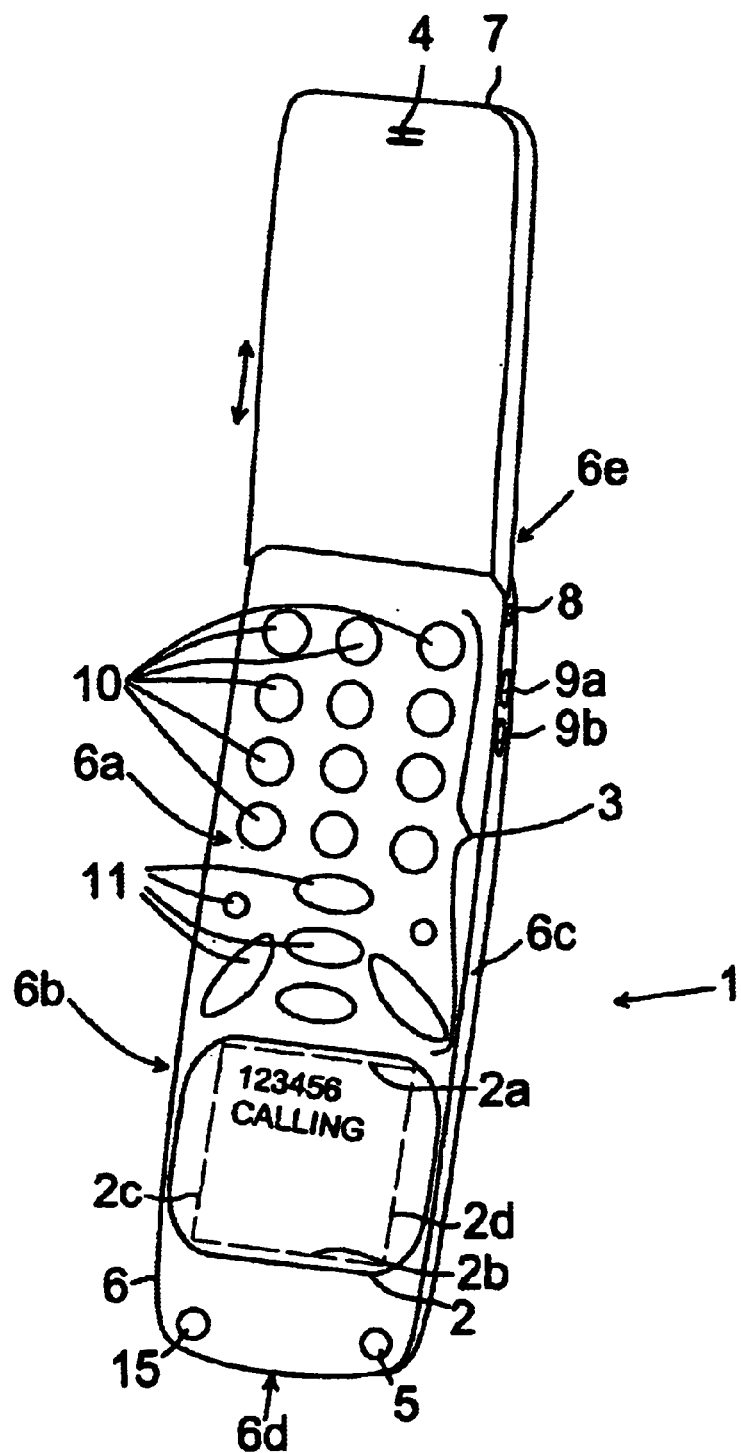
FIG. 3 shows a wireless communication device according to a preferred embodiment of the invention in a perspective view.

For browsing or changing the settings of the wireless communication device 1, and for performing other additional functions, such as the functions of a telephone directory, the second group 11 of control keys of the wireless communication device 1 according to an advantageous embodiment of the invention, as shown in FIG. 3, is further provided with a menu key, browsing keys, an accept key, and a cancel key.

The first group 10 of the keys is placed in the housing of the wireless communication device so that they are nearer the second edge 6e of the housing than the first end 6d of the housing. The second group 11 of the keys are placed so that they are mainly further from the second end 6e of the housing than the first group 10 of the keys. This kind of arrangement of the groups 10, 11 of keys makes the selection of a telephone number or the writing of text messages easier than in wireless communication devices of prior art.

The display means 2 is placed in the housing of the wireless communication device so that the lower edge 2b of the display field is closer to the first end 6d of the housing than the upper edge 2a of the display field. The display means 2 is oriented such that the characters and possible graphical figures to be displayed to the user are shown in a position and orientation natural to the user enabling them to be read and interpreted in a manner conventional to the user. Information displayed on the display means 2 can be viewed through the front panel 6a, e.g. via a transparent window.

Figure 4B:
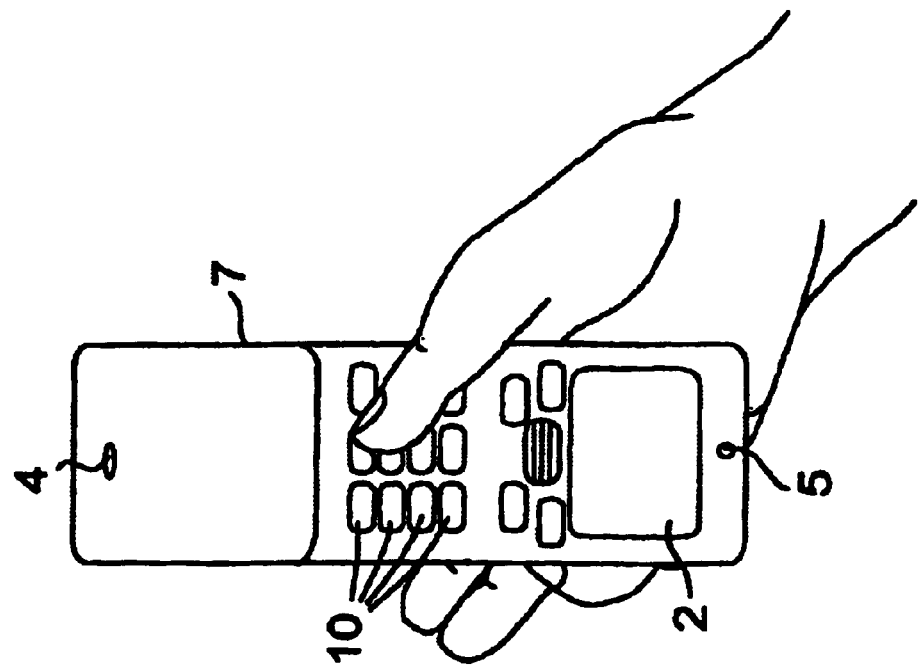
FIG. 4b shows another wireless communication device according to an advantageous embodiment of the invention placed in a use position, seen from the front.
Figure 4A:
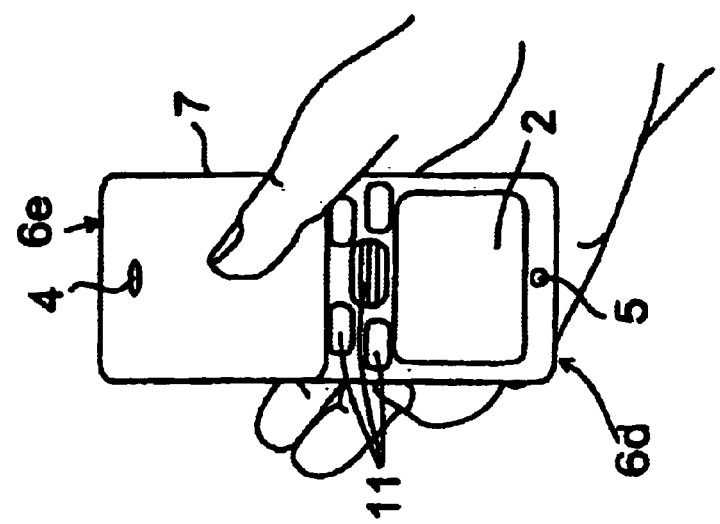
FIG. 4a shows another wireless communication device according to an advantageous embodiment of the invention placed in a standby position, seen from the front.

Furthermore, the wireless communication device 1 comprises a keypad cover part 7. This cover part is arranged to be preferably slidable between a first and a second limit position in the longitudinal direction of the housing 6. In the first limit position, the cover part 7 is slid over the keypad 3, wherein at least part of the keypad, preferably the first group 10 of keys, is covered. Correspondingly, in the second limit position, which in this specification will also be called the use position, the slide part 7 is slid upwards and the keypad 3 is available for use (FIGS. 3 and 4b). At other times, the cover part 7 can be slid over the keypad, as shown in FIG. 4a, wherein the cover part 7 also acts as a barrier preventing pressing of the keys (keylock) and protecting the keys of the keypad 3 under the cover part from mechanical damage. It is also possible that the keylock includes means for electrical disablement of those keys that are not covered by the cover part 7.

In an advantageous embodiment of the invention the cover part 7 can be arranged so that it does not necessarily cover the whole keypad in the first limit position as shown in FIG. 4a. Therefore the user can also perform some control operations with the wireless communication device when the cover part 7 is in the first limit position, e.g. by using the second group 11 of keys.

The wireless communication device 1 according to an advantageous embodiment of the invention is operated with one hand preferably in the following way. It is assumed that the wireless communication device 1 is in the standby position so that the cover part 7 is in the first limit position, i.e. positioned over the keypad 3. The user takes the wireless communication device 1 either in his/her right or left hand so that the first end 6d of the housing of the wireless communication device is close to the user's wrist and the second end 6e is close to the fingers. Thus, the display field of the display means 2 close to the first end 6d of the housing is in a position, in which the information displayed on the display field is visible to the user's view in a natural position. This situation is illustrated by the appended FIG. 4a. The user slides the cover part 7 from over the top of the keypad 3, wherein the situation corresponds to that shown in FIG. 4b. The location of the keys in the keypad 3, particularly the first group 10 of keys, is advantageous for the fingers, especially for the thumb. Thus, it is considerably easier to press the keys of the keypad 3 than in wireless communication devices of prior art, which also reduces the stress on the fingers. Moreover, the wireless communication device 1 can be placed closer to the wrist than wireless communication devices of prior art, wherein the grip by the hand on the wireless communication device is also firmer and more secure. The keys of the keypad 3 are pressed preferably by the thumb which is placed on the side of the front panel 6a when the wireless communication device 1 according to the preferred embodiment of the invention is held in the hand. Thus, the other fingers and the palm support the wireless communication device 1 in its place.

In the wireless communication device 1 according to the preferred embodiment of the invention, the earpiece 4 is placed advantageously in connection with the cover part. The microphone 5 is placed advantageously in the front panel 6a, preferably close to the first end 6d of the housing, e.g. between the display means 2 and the first end 6d of the housing. Thus, when the cover part 7 is slid into the use position, the distance between the earpiece 4 and the microphone 5 is advantageous in view of the distance between the ear and; mouth of the user. The cover part 7 is also equipped with the necessary wirings (not shown) for conducting an audio signal to the earpiece 4 in a way known as such. In the earpiece 4, the electric audio signal is converted into an acoustic audio signal. It is obvious that the earpiece 4 can be also replaced by other known means, such as a small loudspeaker, for accomplishing the electroacoustic conversion.

The wireless communication device 1 can also be equipped with one or several means 8 for detecting the position of the cover part 7, such as a switch or the like. Thus, the position detecting means 8 generates a first signal, such as a voltage according to the logical 0 state (preferably ca. 0 V) when the cover part 7 is positioned over the keypad.

Correspondingly, the position detecting means 8 generates a second signal, such as a voltage according to the logical 1 state (preferably ca. a voltage corresponding to the operating voltage) when the cover part 7 is slid away from over the top of the keypad 3. This signal generated by the position detecting means 8 can be used, in addition to or in place of the answer key and hang up key, for answering and terminating a call. Thus, a call can be answered by sliding the cover part 7 away from over the top of the keypad 3, and the call can be terminated by sliding the cover part 7 back over the keypad 3.

It is obvious that the wireless communication device 1 according to the invention can differ from the above presented embodiment in practical applications. For example, the keypad 3 of the wireless communication device can be implemented partly or wholly by means of one or more touch-sensitive means instead of keys or buttons, or as a touch-sensitive screen 16 which may be combined with a display means such as a liquid crystal display (LCD). Thus, in the touch-sensitive screen, areas are defined for different key functions, wherein touching such an area e.g. with a finger performs a function corresponding to the pressing of a key. FIG. 5 illustrates a wireless communication device according to an advantageous embodiment of the invention comprising a combined touch-sensitive screen 16 and display means 2. The touch-sensitive screen 16 is divided into a part corresponding to a conventional keypad 3 and a part corresponding to a conventional display means 2, the relative location of the touch screen and the touch-sensitive regions of the keypad being defined according to the invention. The touch-sensitive means can also be located at least partly over the display means 2 wherein it is possible to display e.g. key-related information and/or other information on the display means 2.

The cover part 7 of the wireless communication device 1 according to the invention can also be implemented e.g. as a hinged, folding cover arrangement instead of a slide.

The present invention is not limited solely to the embodiments presented above but it can be modified within the scope of the appended claims.

What is claimed is:

1. A wireless communication device comprising:
   a display having a display field for presenting information;
   means for performing key functions comprising a first part and a second part, said first part of said means for performing key functions being for performing at least functions associated with number keys;
   an electro-acoustic transducer for converting an electric audio signal into an acoustic audio signal;
   a housing comprising at least a first end, a second end, and a front panel located between the first and second ends, said display and said means for performing key functions being situated in connection with said front panel;
   a cover part attached to said housing arranged for movement between a first limit position and a second limit position, in which first limit position at least the first part of said means for performing key functions is covered by the cover part and the display field of the display remains uncovered by the cover part, and in which second limit position both the first part and the second part of said means for performing key functions and the display field of the display are uncovered by the cover part;
   said display and said first and second parts of said means for performing key functions being located in the housing of the wireless communication device in fixed relation with respect to each other such that the second part of said means for performing key functions is located between the first part of said means for performing key functions and the display, and the display is located nearer the first end of the housing than the first part of said means for performing key functions and the electro-acoustic transducer.

2. A wireless communication device according to claim 1, wherein the electro-acoustic transducer is located in connection with said cover part.

3. A wireless communication device according to claim 1, comprising a microphone.

4. A wireless communication device according to claim 1, wherein said cover part is arranged to be slideable between the first limit position and the second limit position.

5. A wireless communication device according to claim 1, wherein in the first limit position said cover part is arranged to cover said first part of said means for performing key functions and at least part of said second part of said means for performing key functions remains uncovered.

6. A wireless communication device according to claim 1, comprising position detector for detecting the position of the cover part and for providing information about the position of the cover part.

7. A wireless communication device according to claim 6, arranged to use the information regarding the position of the cover part provided by said position detector in answering a call.

8. A wireless communication device according to claim 6, arranged to use the information regarding the position of the cover part provided by said position detector in terminating a call.

9. A wireless communication device according to claim 1, wherein said means for performing key functions comprise a touch-sensitive screen.

10. A wireless communication device according to claim 9, wherein said touch-sensitive screen is combined with said display.

11. A wireless communication device according to claim 9, wherein said touch-sensitive screen and said display are partly overlapping.

12. A wireless communication device according to claim 3, wherein said microphone is located close to the first end of the housing.

13. A wireless communication device according to claim 1, wherein the cover part is a flap arranged to be pivoted between the first limit position and the second limit position.

14. A wireless communication device according to claim 1, wherein in the first limit position said cover part is arranged to cover said first part of said means for performing key functions and all of said second part of said means for performing key functions remains uncovered.

15. A wireless communication device according to claim 1, wherein said means for performing key functions comprise push-button keys.

16. A wireless communication device according to claim 1, wherein the second part of said means for performing key functions is for performing at least control function.

17. A wireless communication device according to claim 1, wherein the first part of said means for performing key functions has a text mode of operation for writing text.

18. A wireless communication device according to claim 1, wherein information displayed on the display field is shown in a position and orientation natural to the user, enabling it to be intepreted in a conventional manner.

19. A wireless communication device according to claim 1, wherein the cover part provides a key lock function.

20. A wireless communication device according to claim 19, wherein the key-lock function is arranged to disable an uncovered part of the means for performing key functions.

21. A wireless communication device according to claim 1, wherein the electro-acoustic transducer is a loudspeaker.

* * * * *